Jan. 26, 1954
C. M. TURSKY
2,667,272
SELF-CLEANING FLUID FILTER
Filed Sept. 7, 1950
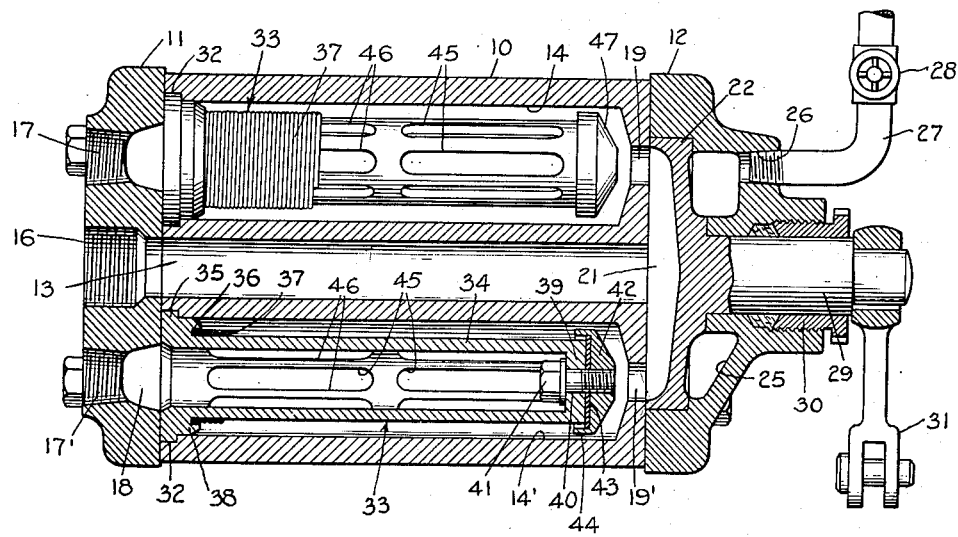
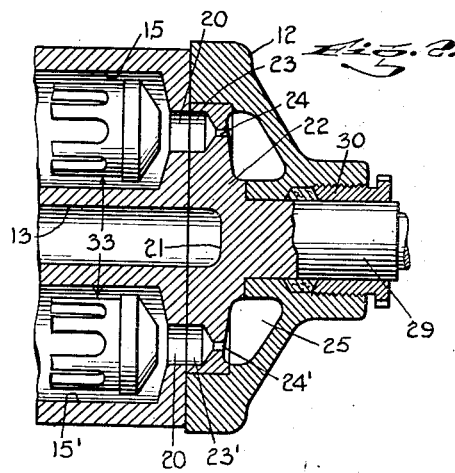
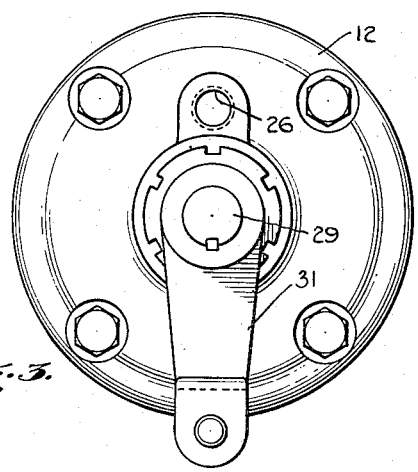
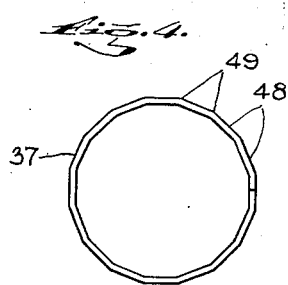
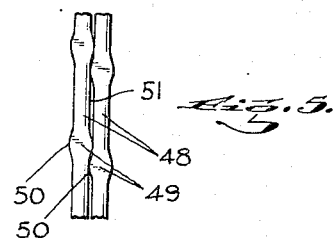
INVENTOR
CHARLES M. TURSKY
BY
ATTORNEY

Patented Jan. 26, 1954

2,667,272

UNITED STATES PATENT OFFICE 2,667,272

SELF-CLEANING FLUID FILTER

Charles M. Tursky, Englewood, N. J.

Application September 7, 1950, Serial No. 183,553

7 Claims. (Cl. 210—168)

This invention relates to filters for use in filtering fluids of various types and kinds. More particularly, the invention deals with a device of this kind adapted for use in filtering fuel and lubricants as applied to various types and kinds of apparatus. Still more particularly, the invention deals with a filter device having means for intermittently moving filter cylinders into cleaning position for removing sediment and foreign matter collected thereon and to restore such cleaning filters for further filtering use by movement into filtering position in the device.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through one pair of filter cylinders of a filter device made according to my invention, showing the same in filtering position and diagrammatically illustrating parts of the construction and with parts removed.

Fig. 2 is a view similar to Fig. 1, taken at right angles to Fig. 1, and showing only part of the construction and indicating the cylinders in self-cleaning position.

Fig. 3 is an end view of the device as seen in Fig. 1.

Fig. 4 is a sectional view through one of the filter elements which I employ; and Fig. 5 is an enlarged diagrammatic view of a part of the face of a filter element illustrating the structure thereof.

In Fig. 1 of the drawing, I have shown at 10 the casing of the filter and at 11 and 12 the end plates of the casing. Centrally of the casing 10 is a cylindrical bore 13 and, around this bore, the casing 10 has two pairs of cylinders 14, 14', note Fig. 1, 15, 15', note Fig. 2, the cylinders 15 and 15' being disposed at right angles to the cylinders 14, 14'.

The cap 12 has an admission port 16 communicating with the bore 13 for introduction of fluid to be filtered. This cap also has exhaust ports 17, 17' communicating with an annular passage 18 which is in communication with all of the cylinder 14, 14'; 15, 15'. The other end of the cylinders 14, 14' have ports 19, 19' and the cylinders 15, 15' have corresponding ports 20, 20' and these ports are adapted to register either with one bipass passage 21 in a rotating valve 22, or with two discharge passages 23, 23' in the valve 22, the passages 23, 23' having hollow discharges, as at 24, 24' into an annular discharge chamber 25 in the cap 12, the annular discharge chamber 25 having an outlet 26, as noted in Fig. 1. At 27 I have diagrammatically shown an exhaust pipe with a pressure regulating valve 28 therein, controlling the discharge from the chamber 25.

The valve 22 has a stem 29 rotatable in the cap 12 or in a packing gland 30 in said cap. Fixed to the outer end of the stem 29 is an operating lever 31 which may be manually or otherwise operated for movement of the valve into different positions.

In Fig. 1 of the drawing, the valve 22 is shown with the bi-pass passage 21 registering with the apertures 19, 19'. In this position of the valve, the ports 23, 23' will register with the apertures 20, 20' as will appear from a consideration of Fig. 2. However, by rotating the valve 22 90°, the passage 21 can be brought into registering position with the apertures 20, 20', thus bringing the apertures 23, 23' in registering position with the apertures 19, 19'. In this last position, the cylinders 14, 14' will be in a cleaning position, rather than in the filtering position, as seen in Fig. 1.

The cylinders 14, 14'; 15, 15' have, at their ends adjacent the cap 11, enlarged seats as, for example, at 32 in Fig. 1 for reception of filter elements, generally identified by the reference character 33.

As all of these elements are of the same construction, the brief description of one will apply to all and distinction of the elements will be characterized by the different cylinders which have been identified.

In Fig. 1 of the drawing, the element 33 in the cylinder 14' is shown in section and, from this showing, it will appear that the element comprises an elongated, substantially thimble-shaped casing 34, having an enlarged flange end 35 fitting snugly in the seat 32, the enlargement 35 having an annular groove 36 forming a seat for one end of a tubular filter 37, a packing being preferably employed at the bottom of the groove 36, as indicated at 38. The other closed end 39 of the filter casing 34 has a bore 40 for the reception of a screw or nut 41 employed to retain a flanged disc 42 on the end of the casing 34. Between the casing and the disc 42 is a packing 43 and this disc 42 forms another groove seat 44 for the other end of the filter 37. The walls of the filter casing 34 have longitudinally and circumferentially spaced elongated openings 45 sub-divided by fine ribs 46, thus exposing the major portion of the filter casing for circulation of fluid therethrough and through the filter 37. It will appear that the disc 42 terminates short of the end of the cylinders 14, 14'; 15, 15' adjacent the apertures 19, 19'; 20, 20', thus providing free circulation of fluid therearound, the disc being bevelled, as seen at 47, to facilitate this circulation.

The filter 37 which may be termed the filter element proper is formed from a coil spring, wherein each coil has a series of circumferentially spaced flats, as indicated clearly at 48 in Fig. 4 of the drawing, these flats being formed by shaping the coil over a mandrel and where the bends 49 are located between each flat, these bends produce lateral enlargements, as indicated at 50 in Fig. 1 of the drawing. Normally, these enlargements of adjacent windings of the coil spring are substantially in the position diagrammatically illustrated in Fig. 5 of the drawing, thus producing on the spring a spiral arrangement of the enlargements 50.

In Fig. 5 of the drawing, the windings are shown in what may be termed a normal relationship, that is to say, when the flats 48 are in closest proximity to each other. However, the filter element 37 can be so made as to lengthen in its fit between the recesses 36 and 44 so as to require slight rotation of the spring, causing the projections 50 to ride one upon the other, thus increasing clearance at 51 between the flats 48 to adapt a single filter to varied uses, insofar as degree of filterization is concerned. This control can also be provided by varying the number of flats in each winding of the element 37 and by the size and cross-sectional contour of the wire. Generally speaking, round wire is preferred as a substantially line contact or control is thus provided between the adjacent windings which facilitates passage of the fluid through the coil in the filtering position, as well as the self-cleaning position.

In the use of the device, fluid is circulated through the device by admission into the cylinders 14, 14' from the bore 13, passage 21 and ports 19, 19'. The fluid then passes through the filter 37 in the cylinders 14, 14', then into the annular passage or chamber 18 and out through the exhaust 17, 17' for supply to the apparatus. In the early stages, the fluid entering the passage 18 will also pass into the cylinders 15, 15' but will not be discharged therefrom due to suitable control governed by the pressure regulating valve 28. As and when the filter elements 37 of the cylinders 14, 14' become congested, and this may be regulated by predetermined timing, the valve 22 is rotated to bring the passage 21 into registering position with the cylinders 15, 15' which automatically brings the passages 23, 23' in registering position with the ports 19, 19'. In this position, filtering will take place by passage of the fluid through the elements 33 in the cylinders 15, 15' and the fluid will be circulated through the elements 33 in the cylinders 14, 14' in the reverse direction, thus cleaning the filter 37 and exhausting the filtered fluid out through pipe 27 and valve 28.

In due time, the above operation will be repeated and filtering will again take place in the cylinders 14, 14' by again shifting the valve 22 back to the position shown in Fig. 1. It will be apparent that the showing in Fig. 5 of the drawing is exaggerated for sake of clarity, particularly in illustrating a slight clearance, as at 51. In actual practice and with certain types of filters, the clearance, as at 51, would hardly be noticeable to the eye.

Having fully described my invention, what I claim as new and desire to secure by Letters Patent is:

1. A fluid filter of the character described, comprising a casing having two pairs of opposed cylinders therein, end plates on said casing, one plate having an annular chamber communicating with all of said cylinders, said plate having means for discharging fluid from said chamber, said plate having an intake port, the casing having a passage communicating with said port and opening through the opposed end of the casing, a valve rotatably mounted in the other plate and having a passage communicating with the passage of said casing, said cylinders having ports controlled by said valve, said passage of the valve being adapted to be brought into registering position with the last named ports of opposed cylinders, the second named plate having a discharge chamber with discharge means communicating therewith, said valve having a pair of ports adapted to be brought into registering position with the ports of opposed cylinders to place said cylinders in communication with the discharge chamber of said second named plate, means externally of the second named plate for actuating said valve, and filter elements supported in each of said cylinders.

2. A fluid filter of the character described, comprising a casing having two pairs of opposed cylinders therein, end plates on said casing, one plate having an annular chamber communicating with all of said cylinders, said plate having means for discharging fluid from said chamber, said plate having an intake port, the casing having a passage communicating with said port and opening through the opposed end of the casing, a valve rotatably mounted in the other plate and having a passage communicating with the passage of said casing, said cylinders having ports controlled by said valve, said passage of the valve being adapted to be brought into registering position with the last named ports of opposed cylinders, the second named plate having a discharge chamber with discharge means communicating therewith, said valve having a pair of ports adapted to be brought into registering position with the ports of opposed cylinders to place said cylinders in communication with the discharge chamber of said second named plate, means externally of the second named plate for actuating said valve, filter elements supported in each of said cylinders, each of said filter elements comprising an openwork elongated thimble-shaped casing, and a coiled filter enveloping the openwork portion of said filter casing.

3. A fluid filter of the character described, comprising a casing having two pairs of opposed cylinders therein, end plates on said casing, one plate having an annular chamber communicating with all of said cylinders, said plate having means for discharging fluid from said chamber, said plate having an intake port, the casing having a passage communicating with said port and opening through the opposed end of the casing, a valve rotatably mounted in the other plate and having a passage communicating with the passage of said casing, said cylinders having ports controlled by said valve, said passage of the valve being adapted to be brought into registering position with the last named ports of opposed cylinders, the second named plate having a discharge chamber with discharge means communicating therewith, said valve having a pair of ports adapted to be brought into registering position with the ports of opposed cylinders to place said cylinders in communication with the discharge chamber of said second named plate, means externally of the second named plate for actuating said valve, filter elements supported in each of said cylinders, each of said filter elements comprising an openwork elongated thimble-shaped casing, a coiled filter enveloping the openwork portion of said filter casing, and each winding of the coil filter including a plurality of circumferentially spaced flat sections.

4. A fluid filter of the character described, comprising a casing having two pairs of opposed cylinders therein, end plates on said casing, one plate having an annular chamber communicating with all of said cylinders, said plate having means for discharging fluid from said chamber, said plate having an intake port, the casing having a passage communicating with said port and opening through the opposed end of the casing, a valve rotatably mounted in the other plate and having a passage communicating with the passage of said casing, said cylinders having ports controlled by said valve, said passage of the valve being adapted to be brought into registering position with the last named ports of opposed cylinders, the second named plate having a discharge chamber with discharge means communicating therewith, said valve having a pair of ports adapted to be brought into registering position with the ports of opposed cylinders to place said cylinders in communication with the discharge chamber of said second named plate, means externally of the second named plate for actuating said valve, filter elements supported in each of said cylinders, each of said filter element comprising an openwork elongated thimble-shaped casing, a coiled filter enveloping the openwork portion of said filter casing, each winding of the coil filter including a plurality of circumferentially spaced flat sections, and said flat sections being joined by laterally extending enlarged portions.

5. A filter device of the character described, comprising a casing having pairs of opposed cylinders therein, filter elements arranged in said cylinders, means centrally of the casing and opening through one end thereof for introducing a fluid into the casing for admission into opposed cylinders at the other end of the casing for passage through said filters, means at said end of the casing for discharging the filtered fluid therefrom, a rotatable valve at the other end portion of the casing controlling transmission of fluid into a pair of opposed cylinders and simultaneous discharge of fluid from other opposed cylinders from the second named end of the casing, and a pressure regulating valve controlling said last named discharge.

6. A fluid filter comprising a casing, end plates closing the ends of said casing, the casing having a central bore, two pairs of opposed cylinders in the casing around said bore, one end plate having an annular chamber communicating with all of the cylinders and an admission port communicating with one end of said bore, a valve rotatably mounted in the other end plate, the end of the cylinders adjacent the valve having ports, said valve having a transverse passage adapted to register with the ports of opposed cylinders and said bore, said valve also having a pair of passages adapted to register with ports of opposed cylinders, the second named plate having an annular chamber arranged outwardly of said valve, the last named passages of said valve communicating with the annular chamber of said second named end plate, a valve control outlet to the chamber of said second named end plate, and filter elements arranged in each of said cylinders and directly communicating with the annular chamber of the first named end plate.

7. A fluid filter comprising a casing, end plates closing the ends of said casing, the casing having a central bore, two pairs of opposed cylinders in the casing around said bore, one end plate having an annular chamber communicating with all of the cylinders and an admission port communicating with one end of said bore, a valve rotatably mounted in the other end plate, the end of the cylinders adjacent the valve having ports, said valve having a transverse passage adapted to register with the ports of opposed cylinders of said bore, said valve also having a pair of passages adapted to register with ports of opposed cylinders, the second named plate having an annular chamber arranged outwardly of said valve, the last named passages of said valve communicating with the annular chamber of said second named end plate, a valve control outlet to the chamber of said second named end plate, filter elements arranged in each of said cylinders and directly communicating with the annular chamber of the first named end plate, and said filter elements being detachable with respect to the cylinders of the casing upon removal of said first named end plate.

CHARLES M. TURSKY.

References Cited in the file of this patent

UNITED STATES PATENTS

| Number | Name | Date |
|---|---|---|
| 516,140 | Weir | Mar. 6, 1894 |
| 844,438 | Bayley | Feb. 19, 1907 |
| 930,401 | Monteagle | Aug. 10, 1909 |
| 1,784,103 | Lowen | Dec. 9, 1930 |
| 2,007,780 | Wardle | July 9, 1935 |
| 2,008,598 | Seeley | July 16, 1935 |
| 2,081,198 | Hahn | May 25, 1937 |
| 2,100,266 | Perry | Nov. 23, 1937 |
| 2,342,669 | Hoffman | Feb. 29, 1944 |
| 2,347,927 | Paterson et al. | May 2, 1944 |
| 2,423,172 | Booth | July 1, 1947 |
| 2,468,603 | Pew | Apr. 26, 1949 |

FOREIGN PATENTS

| Number | Country | Date |
|---|---|---|
| 520,298 | Great Britain | Apr. 19, 1940 |
| 583,639 | Germany | Sept. 7, 1933 |